E. W. GIBBS.
TOP.
APPLICATION FILED JUNE 4, 1921.
Reissued Oct. 24, 1922. 15,475.
Fig. 1.
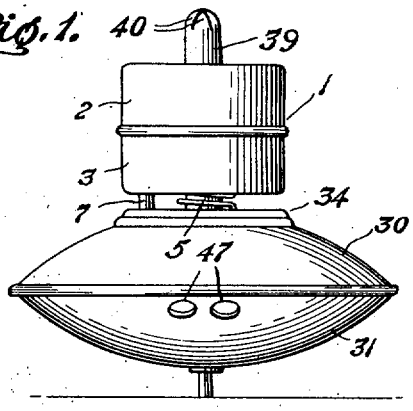
Fig. 2.
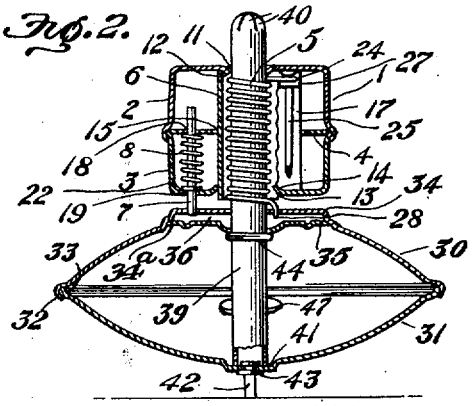
Fig. 3.
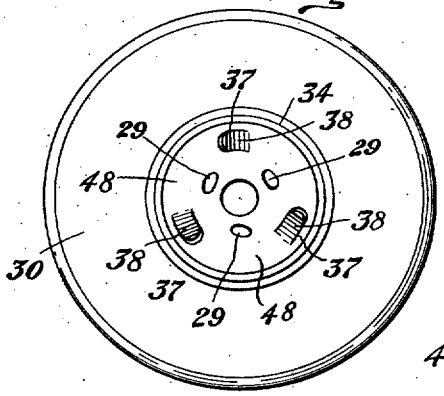
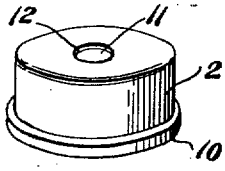
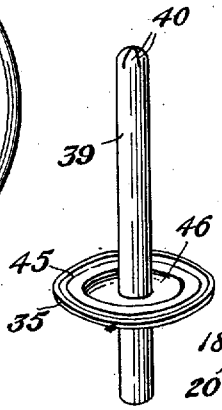
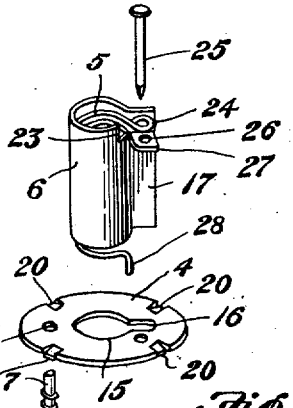
Fig. 5.
Fig. 6.
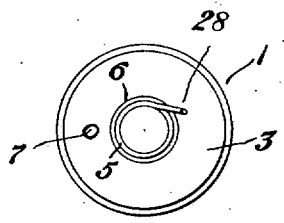
Fig. 4.
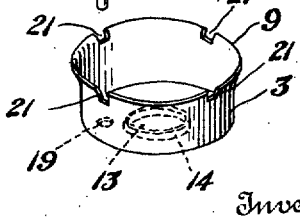
Inventor
Elmer W. Gibbs
By: Frease, Merkel, Sewell and Bond
Attorneys.

Reissued Oct. 24, 1922. Re. 15,475

UNITED STATES PATENT OFFICE.

ELMER W. GIBBS, OF CANTON, OHIO, ASSIGNOR TO THE GIBBS MANUFACTURING COMPANY, OF CANTON, OHIO, A CORPORATION OF OHIO.

TOP.

Original No. 1,317,699, dated October 7, 1919, Serial No. 298,888, filed May 22, 1919. Application for reissue filed June 4, 1921. Serial No. 475,096.

*To all whom it may concern:*

Be it known that I, ELMER W. GIBBS, a citizen of the United States, residing at Canton, in the county of Stark and State of Ohio, have invented new and useful Improvements in Tops, of which the following is a specification.

The invention relates to the construction of tops and twisting heads for tops of the type shown in Letters Patent No. 847,933, issued to me on March 19, 1907, and Letters Patent No. 1,005,020, issued to me on October 3, 1911; and the improvements include the making of a light but strong and durable top and head out of sheet metal in an economical manner, the head being so constructed that the twisting spring is mounted and secured in such manner that it cannot become accidentally displaced from the head.

The objects of the invention are to construct a top and twisting head of sheet metal, in which the parts will be strong and durable and economically constructed and to generally improve and simplify devices of the character disclosed in my patents above mentioned.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a side elevation of a top with the twisting head thereon;

Fig. 2, a vertical section of the same;

Fig. 3, a plan view of the top with the twisting head removed;

Fig. 4, a lower end view of the twisting head;

Fig. 5, a perspective view of the several parts of the twisting head in position for assembling; and Fig. 6, a perspective view of the stem of the top.

A practical embodiment of the invention is disclosed in the accompanying drawing, forming a part of this specification, in which similar numerals of reference indicate corresponding parts throughout the several views.

The twisting head 1 is composed of the case members 2 and 3, the disk partition 4, the twisting spring 5, the spring barrel 6, the locking pin 7 and the locking spring 8, which parts are separately made, preferably as illustrated in Fig. 5, and are then assembled to form the completed head as shown in Fig. 2.

The case members 2 and 3 are shaped or stamped out of sheet metal in the form of cylindric cups, the rim of the member 3 being provided with the lip flange 9 and the rim of the member 2 being provided with the rabbet flange 10 adapted to telescope over and then be bent over the lip flange to form the completed case, as shown in Figs. 1 and 2.

The closed or outer end of the case member 2 is provided with the concentric opening 11, having the inturned annular flange 12 bent inward therefrom to receive the stem of the top as will be later described; and the closed or outer end of the case member 3 is provided with an aperture 13 having a similar inturned annular flange 14 arranged to receive the lower extremity of the spring barrel 6.

The transverse disk partition 4 is provided in the case, wherein its edges are clamped and secured between the flanges of the case member when the same are engaged together as shown in Fig. 2. This partition is provided with the central aperture 15 through which the spring barrel 6 extends, and a radial slot 16, communicating with said central aperture, to receive the radial projecting portion 17 of the spring barrel to prevent rotation of said spring barrel. A lateral aperture 18 is provided in the disk, which with the similar aperture 19 in the end of the lower case member, constitute guides in which the locking pin 7 is located and adapted to operate endwise.

The disk partition is preferably provided around its periphery with the deflected tongues 20 which may be cut in the periphery and are arranged to engage in the notches 21 provided in the lip flange 9 of the lower case member, thus serving to stop the case member against rotation with relation to the case of the twisting head.

The locking pin 7 is provided with the stop flange 22 near its lower projecting end, which normally abuts the lower end of the case, between which flange and the transverse partition is located the locking spring 8, which is preferably in the form of a spiral extending around the pin and by its energy serves to hold the pin in its normal downward projecting position. For the purposes of the locking pin and its frame it will be understood that the end of the case and the transverse partition may be collectively considered as cross walls.

The spring barrel 6 is composed of sheet metal, the ends of which are bent radially as shown at 17, the spring 5 being contained within said barrel, the upper end of the spring extending through the notch 23 and provided with an eye 24, a pin 25 being passed through said eye and through the registering aperture 26 in the out-turned ear 27 formed upon the upper end of one of the radial portions 17. A projecting hook 28 is provided upon the lower end of the spring and projects beyond the barrel and lower case member and is adapted to releasably engage in the recesses or sockets 29, which are provided for that purpose in the upper end of the top. The spring barrel is mounted between the outer or closed ends of the case members, the upper end of said barrel bearing against the upper end of the case, while the lower end of the cylindrical portion of the barrel projects through the aperture 13 in the lower wall of the case, the radial portion 17 of the barrel, which is slightly shorter than the cylindrical portion, engaging the bottom wall of the case.

It is evident that by this construction and arrangement of the parts a better and more efficient twisting head is produced than is disclosed in either of my prior patents above referred to as the secured end of the spring does not project outside the corresponding end of the case nor does the fastening means for the securing end of the spring project outside of the case and there is therefore no danger of cutting or injuring the hand of the user by the breaking or disconnecting of this end of the spring nor is there danger of this end of the spring becoming disconnected as the entire spring and connecting means, with the exception of the projecting hook 28, is carried within the case. A simple but substantial twisting head is thus made which is well adapted to the purpose of spinning the top, which operation will be later described.

The top comprises the upper and lower concaved members 30 and 31 respectively, which are connected together by means of the rabbet and lip flanges 32 and 33 formed upon the adjoining edges of the two sections. The upper section is provided with the raised portion 34 which receives the disk 35 forming an air chamber 36 between the disk and the top surface of the raised portion 34, a practically air tight joint being produced between the disk and the inner surface of the top, thus cutting off the inflow of air into the interior of the top.

The upper surface of the raised portion 34 is provided with the apertures or sockets 29 and with the curved indentations or slots 37, inclined tongues 38 being located in said slots. The stem 39 which extends from above the upper top member downward to the lower top member, is preferably formed of sheet metal of cylindrical form, the upper end thereof having cusps 40 formed thereon, which are bent as shown in Figs. 2 and 6 forming an upper rounded closed end for the stem. The lower end of the stem is open and rests within the socket 41 formed in the lower member of the top, the head of the spindle 42 being received within said lower end of the stem, thereby centering the lower end of the stem. An integral flange 43 may be formed upon the spindle and bears against the bottom wall of the socket 41.

The disk 35 is mounted upon the stem 39 and its peripheral edge is held in tight engagement with the annular shoulder 34[a] formed in the rim of the raised portion 34, by means of the annular rib 44 formed upon the stem. This disk 35 is provided with a reinforcing annular corrugation 45, and is preferably concave as shown at 46, for the purpose of strengthening the disk and allowing its peripheral edge to be forced into tight engagement with the annular shoulder in the rim of the raised portion 34, without bending the disk. The length of the stem between its lower end and the annular rib thereon, is such that the disk is forced into tight engagement with the shoulder of the raised portion 34, by the pressure of the socket 43 against the lower end of the stem, when the rabbet and lip flanges on the edges of the top sections are engaged together.

For the purpose of producing a humming top, the lower section 31 is provided with the apertures 47 and in order to produce a humming sound the inflow of air into the top body must be cut off and for this purpose the disk 35 is so mounted within the top that a practically air tight joint is formed between the disk and the inner wall of the top.

The operation of the top may be briefly described as follows: The stem 39 of the top is inserted from the lower end upward through the hollow of the twisting spring as best shown in Fig. 2, and the projecting hook 28 on the lower end of the spring is engaged with one of the recesses 29 in the upper surface of the top. The head is then rotated to twist the spring in which operation the locking pin successively enters and engages as a ratchet in the inclined recesses 37, the resilience of the locking spring 8 permitting the pin 7 to ride over the intervening faces 48 of the top.

When the spring has been sufficiently twisted, the top is spun as by merely holding the sides of the twisting head between the first two fingers and pressing the stem downward with the thumb which serves to disengage the locking pin 7 from the top and permits the twisting spring to unwind itself in doing which it rapidly rotates the top with the stem thereof as an axle in the twisting spring, until the hooked end of the stem is disengaged from the top recess after which the head is lifted from the stem of the top or the stem of the top drops out of the head.

It will be noted that the barrel 6 not only holds the fixed end of the twisting spring 5 against movement with relation to the twisting head but also tends to keep the twisting spring in alinement preventing any buckling of the twisting spring.

I claim:

1. A twisting head for tops including a metal case having cross walls with corresponding apertures therein, a spring barrel abutting opposite walls of the case in axial alinement with said apertures, and a twisting spring located within said barrel and connected at one end to the barrel.

2. A twisting head for tops including a metal case having cross walls with corresponding apertures therein, a spring barrel abutting opposite walls of the case in axial alinement with said apertures, a twisting spring located within said barrel and connected at one end to the barrel, and means for preventing the rotation of the spring barrel.

3. A twisting head for tops including a metal case with a transverse partition therein, there being corresponding apertures in the ends of the case and the partition, a spring barrel located through the aperture in the partition plate, an outward extension upon the spring barrel, the aperture in the partition plate having a corresponding slot to receive said extension, and a twisting spring within the barrel having one end connected to the barrel.

4. A twisting head for tops, including a metal case having cross walls with corresponding apertures therein, a spring barrel located between said cross walls and in axial alinement with the apertures therein, an out-turned flange near the upper end of the spring barrel, a spiral twisting spring located within the barrel, the upper end of the spring having an eye formed thereon and a pin located through said eye and said flange.

5. A twisting head for tops including a metal case with a transverse partition therein, there being corresponding apertures in the ends of the case and the partition, the aperture in the partition having a radial extension, a spring barrel located through the aperture in the partition and between the walls of the case, a radial extension on the spring barrel located through the radial aperture in the partition, an out-turned ear near the top of the spring barrel, there being corresponding apertures in said ear and the partition, a spiral twisting spring within the spring barrel, the upper end of the spring having an eye formed thereon, and a pin located through said eye and through the apertures in the ear and partition.

6. A twisting head for tops including a metal case with a transverse partition therein, there being corresponding apertures in the ends of the case and the partition and a radial slot in the partition, a spring barrel located between the ends of the case and through the aperture in the partition, said spring barrel comprising a cylindrical portion located through an aperture in the partition, the longitudinal edges thereof being turned outwardly and passed through the slot in the partition, an out-turned ear formed at the top of one of said out-turned edges, there being corresponding apertures located through said ear and the partition, a spiral twisting spring in the barrel having an eye at its upper end, and a pin passed through said eye and through the apertures in the ear and partition.

7. A sheet metal top body including upper and lower concaved members having rabbet and lip flanges connected together, a division disk forming an air chamber in the upper body member, a tubular stem extending from above the upper top member downward through the disk having an annular bead thereon bearing against the under side of the disk, and a centering socket in the lower body member bearing against the lower end of the stem and forcing the periphery of the disk into tight engagement with the upper body member when the rabbet and lip flanges are connected together.

8. A twisting head for tops including a metal case having cross walls with corresponding apertures therein, a spring barrel abutting opposite walls of the case in axial alinement with said apertures, a twisting spring located within said barrel, and means within the head for stopping rotation of one end of the spring.

ELMER W. GIBBS.